Oct. 11, 1938.   W. B. MOORE ET AL   2,133,252
HANDLE FOR COOKING UTENSILS
Filed Oct. 26, 1936

INVENTORS
Walter B. Moore.
Robert S. Cobb.
BY
ATTORNEYS.

Patented Oct. 11, 1938

2,133,252

UNITED STATES PATENT OFFICE 2,133,252

HANDLE FOR COOKING UTENSIL

Walter B. Moore, Coshocton, and Robert S. Cobb, West Lafayette, Ohio, assignors to The Moore Enameling & Manufacturing Company, West Lafayette, Ohio, a corporation of Ohio Application October 26, 1936, Serial No. 107,556

4 Claims. (Cl. 53—8)

Our invention relates to a handle for cooking utensils. It has to do, more particularly, with a handle which is adapted to be applied to pots, pans or other cooking utensils to facilitate handling and use of such cooking utensils. Our invention is particularly applicable to enamel ware, although it is also applicable to aluminum ware, stainless steel ware, etc.

Enameled ware is commonly made with a metal handle of the same material as the ware. When pots and pans are used in cooking, this handle becomes hot with the result that the pots and pans are difficult to handle. Furthermore, the handles have been so shaped that a firm grip could not be obtained and the handle, consequently, readily slipped from the hand.

One of the objects of our invention is to provide a handle for pots, pans or other cooking utensils, or similar articles, the handle being of such material that it will not absorb heat.

Another object of our invention is to provide a handle of the type indicated which is so shaped that it may be readily and firmly gripped with the hand without danger of slipping from the hand.

Another object of our invention is to provide a handle of the type indicated which may be readily applied to or removed from a cooking utensil or other utensil.

The preferred embodiment of our invention is illustrated in the accompanying drawing wherein similar characters of reference designate corresponding parts and wherein.

Figure 1:
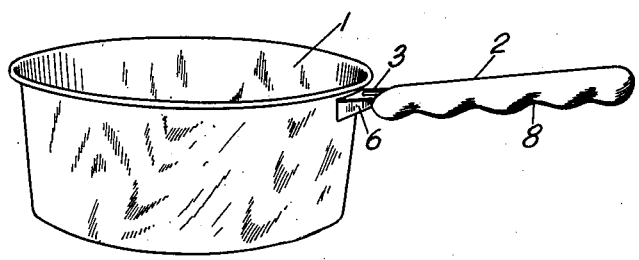
Figure 1 is a perspective view of a cooking utensil showing our handle structure applied thereto.
Figure 2:
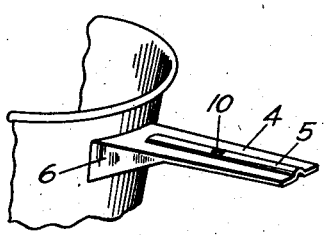
Figure 2 is a detail in perspective, showing a stub on which the handle is mounted.

With reference to the drawing, in Figure 1 we have illustrated an enameled pan 1 having our handle structure, indicated generally by the numeral 2, applied thereto.

The handle structure comprises a stub 3 made of steel which is the material of which the body portion of the pan is made. Thus stub 3 embodies a substantially flat outwardly projecting portion 4, which has its inner end secured to the outer surface of the pan 1. The inner end of the stub 3 is preferably electrically welded to the pan. It is welded to the pan before the pan and stub are enameled. The stub 3 has a longitudinally extending reinforcing rib 5 formed therein. This rib extends substantially the length of the stub. The inner end of the stub is provided at each edge with a downwardly projecting substantially wedge-shaped flange 6 which serves to reinforce the joint where the stub is secured to the pan.

The handle member 7 is preferably of the shape illustrated in the drawings. It is preferably made of some molded plastic material which will not readily conduct heat, such as Bakelite or rubber. However, it can be made of other material which will not readily conduct heat, such as wood. This handle is so formed that it may be readily gripped by the hand and is provided with a plurality of finger grips 8 on its lower surface so that it may be firmly gripped without danger of slippage from the hand.

Figure 3:
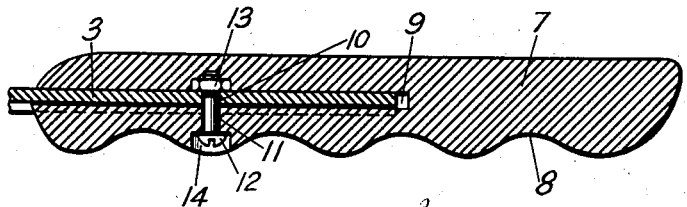
Figure 3 is a section showing the handle on the stub and the means for securing it thereon.

In Figure 3 we have shown means for securing the handle member 7 on the stub 3. The handle member 7 is provided with a socket 9 into which the outer end of the stub 3 may be readily passed. The stub 3 is provided with an opening 10 intermediate the length thereof. The handle member 7 is provided with an opening 11 in its lower portion which is adapted to be brought into alignment with the opening 10 when the handle member 7 is slipped over the stub. A screw 12 passes through the aligning openings 11 and 10 and is threaded into a nut 13 which is embedded in the handle member 7 and in the upper wall of the socket formed therein. The head of the screw 12 is countersunk as at 14 so that the fingers will not contact therewith when the handle member 7 is gripped. This is desirable because the head of the screw may become hot.

Thus, it will be apparent that the bolt structure just described will serve to firmly secure the handle member 7 on the stub 3. The socket in the handle member is so formed that the handle snugly fits on the stub. In case the handle member 7 needs replacing, it can be removed readily, merely by removing the screw 12 and then slipping the handle from the stub. Furthermore, the handle may be readily mounted on the stub and be easily secured thereto.

Figure 4:
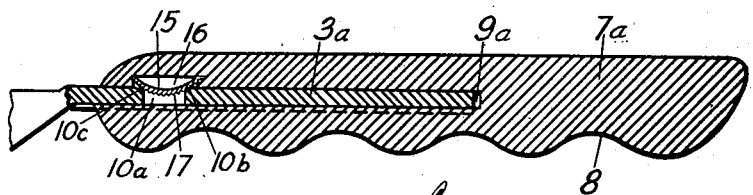
Figure 4 is a view similar to Figure 3 but showing different means for securing the handle on the stub.

In Figure 4 we have illustrated different means for securing a handle 7a on a stub 3a. This means comprises a spring 15 secured within a notch 16 in the upper wall of the socket 9a and projecting downwardly from the upper wall of the socket, as illustrated in this figure. This spring 15 has teeth 17 formed on its lower surface. This spring 15 projects into a slot 10a formed in the stub 3a. The teeth 17 will prevent slipping of the handle member off the stub by engaging the outer edge 10b of the slot 10a. However, slipping of the handle on the stub will be permitted because the inner edge of slot 10a is rounded as at 10c. Thus, with this means, the handle member can be readily slipped over the stub and will be firmly secured thereon.

Figure 5:
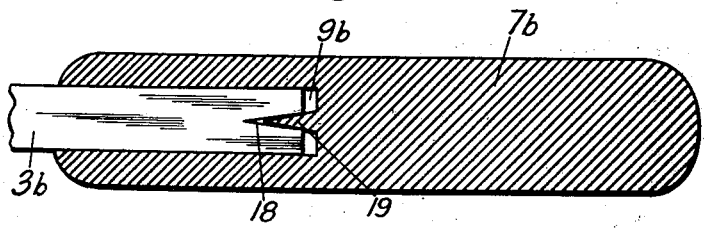
Figure 5 is a section showing another means for securing the handle on the stub.

In Figure 5 we have illustrated a different means for securing a handle member 7b on a stub 3b. The end of the stub is provided with a V-shaped slot 18 which receives a wedge 19 formed on the handle and projecting into the rear end of the socket. When the handle is positioned on the stub, the wedge 19 projects into the slot 18 and spreads the outer end of the stub 3b so that it will grip tightly the side walls of the socket 9b. Thus it will be necessary to merely force the handle on the stub to cause it to be secured firmly thereon.

It will be apparent from the description above that we have provided a handle structure having many desirable features. The stub of the handle structure is made of the same material as the body portion of the pan and may be welded thereto readily. The pan and stub may then be enameled, leaving no unsightly joint between the stub and pan. Although the stub is preferably percussion welded to the pan, it may be secured thereto in other ways, such as riveting, soldering or electrically spot-welding.

The handle member is made of a material which will not readily conduct heat so that it will not become hot when the pan is being used for cooking or other similar purposes. Furthermore, the handle is so shaped that it may be gripped by the hand readily and firmly without danger of slipping from the hand. It may be applied readily to the stub or removed from the stub. The handle structure is of a simple nature and will have a low cost.

Many other advantages will be apparent from the drawing, the preceding description and the following claims.

Having thus described our invention, what we claim is:

1. A handle structure comprising a stub, said stub having a slot formed therein, said handle member having a socket formed therein adapted to receive the stub, said handle member carrying a spring located in one wall of the socket which projects into the slot formed in said stub, said spring having teeth on one surface which cooperate with the slot to permit slipping of the handle on the stub but to permit removal therefrom.

2. In combination, a pan or the like comprising a body portion made of metal, a stub of metal having its inner end welded to said body portion, said stub being substantially flat and projecting outwardly from the body portion of the pan, said stub being provided at its inner end and on each edge thereof with an integral downwardly projecting substantially wedge-shaped reinforcing flange which has its inner and wider end welded to the body portion of the pan, said stub being provided with a longitudinally extending reinforcing rib formed therein, a handle member having a socket formed therein for receiving the stub and being adapted to be slipped over the stub, said handle member and said stub being provided with transverse openings which are in alignment with each other when the handle member is positioned on the stub, and a member passing through said aligning openings for maintaining said handle member in position on the stub.

3. In combination, a pan or the like comprising a body portion made of metal, a stub of metal having its inner end welded to said body portion, said stub being substantially flat and projecting outwardly from the body portion of the pan, said stub being provided at its inner end and on each edge thereof with an integral downwardly projecting substantially wedge-shaped reinforcing flange which has its inner and wider end welded to the body portion of the pan, a handle member having a socket formed therein for receiving the stub and being adapted to be slipped over the stub, and means for maintaining said handle member in position on said stub.

4. In combination, a pan or the like comprising a body portion made of metal, a stub of metal having its inner end secured to said body portion, said stub being substantially flat and projecting outwardly from the body portion of the pan, said stub being provided at its inner end and on each edge thereof with an integral downwardly projecting reinforcing flange which has its inner end secured to the body portion of the pan, said stub being provided with a longitudinally extending reinforcing rib formed therein, a handle member having a socket formed therein for receiving the stub and being adapted to be slipped over the stub, and means for maintaining said handle member in position on said stub.

WALTER B. MOORE.
ROBERT S. COBB.